United States Patent [19]

Abbott et al.

[11] 4,189,250
[45] Feb. 19, 1980

[54] SELF-LOCKING CONNECTOR FOR STORAGE RACKS

[75] Inventors: George A. Abbott, West Bloomfield; Leonard J. Dudzik, Brighton, both of Mich.

[73] Assignee: Jervis B. Webb Company, Farmington Hills, Mich.

[21] Appl. No.: 973,913

[22] Filed: Dec. 28, 1978

[51] Int. Cl.² .................. F16B 7/22; F16L 41/00
[52] U.S. Cl. .................... 403/190; 211/192; 248/222.1; 403/316
[58] Field of Search .............. 403/190, 191, 234, 237, 403/201, 316, 317, 319; 211/191, 192; 248/222.1

[56] References Cited

U.S. PATENT DOCUMENTS

| | | | |
|---|---|---|---|
| 3,195,735 | 7/1964 | Jay | 403/201 X |
| 3,273,720 | 9/1966 | Seiz | 211/192 |
| 3,456,970 | 7/1969 | Sunasky | 403/319 |
| 3,697,034 | 10/1972 | Shell | 211/192 X |
| 3,741,405 | 6/1973 | McConnell | 403/190 X |
| 4,023,683 | 5/1977 | Vargo | 211/192 |
| 4,074,812 | 2/1978 | Skubic et al. | 211/191 |

*Primary Examiner*—Wayne L. Shedd
*Attorney, Agent, or Firm*—Joseph W. Farley

[57] ABSTRACT

A U-shaped connector, having one leg fixed to an end of a horizontal beam of a storage rack and a free leg attachable to a vertical post of such a rack, carries a self-locking spring clip on the free leg. One end of the clip has a locking portion which projects toward the fixed leg through an aperture in the free leg and which overlaps a locking surface on a portion of the vertical post received between the fixed and free connector legs when the beam is attached to the post.

8 Claims, 6 Drawing Figures

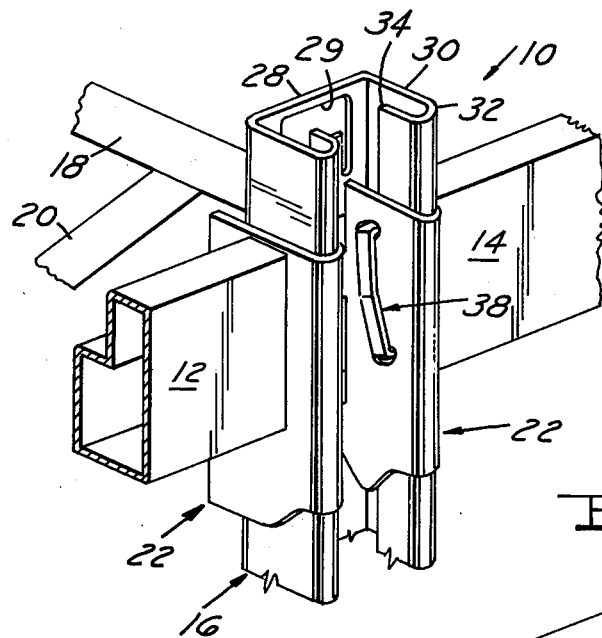
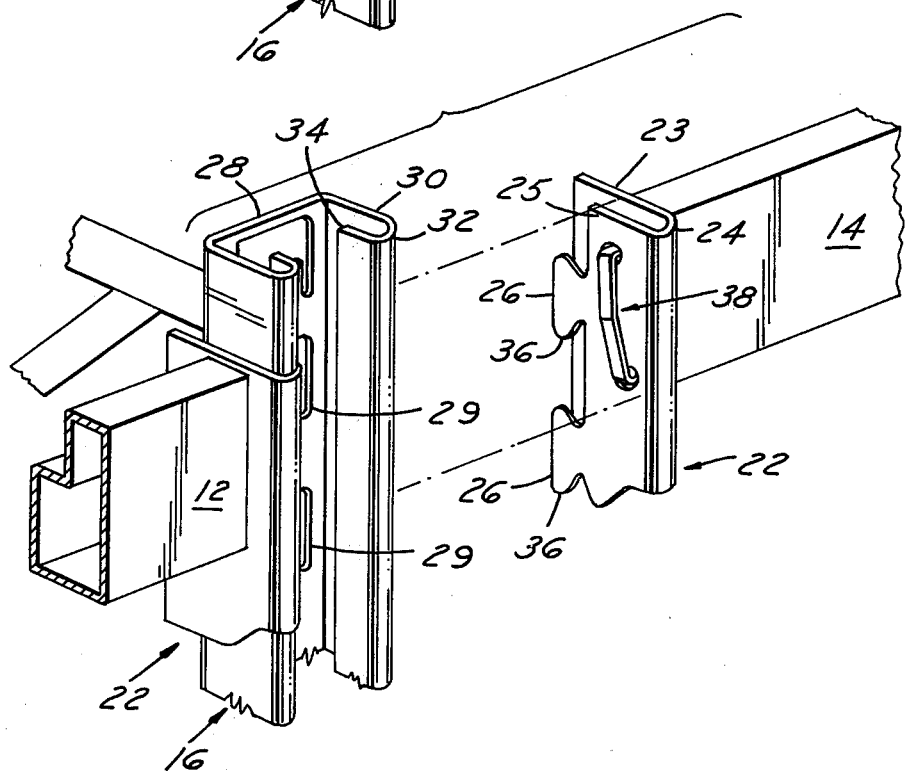

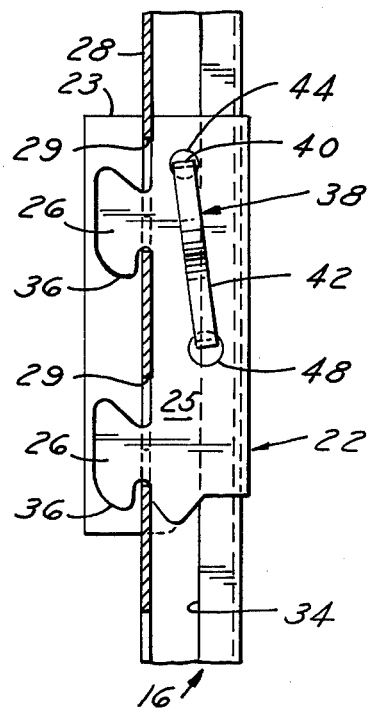
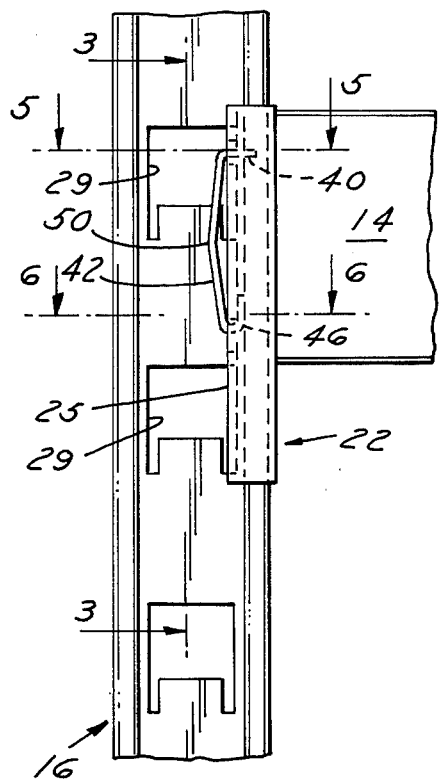
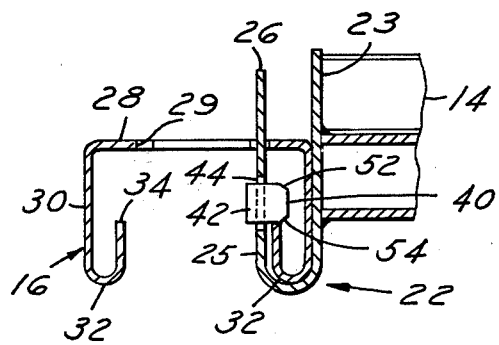
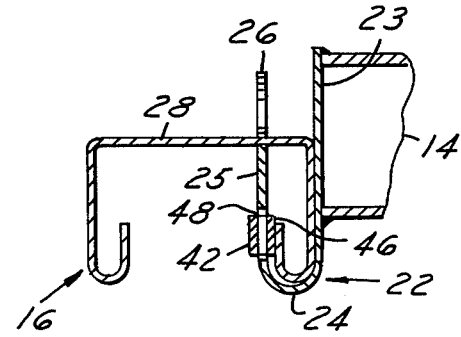

SELF-LOCKING CONNECTOR FOR STORAGE RACKS

This invention related to improvements in a self-locking connector for preventing unwanted or accidental disengagement between a horizontal beam and vertical post of a storage rack.

An embodiment of the invention to be described herein relates particularly to a self-locking connector for use with a rack construction of the type disclosed in FIGS. 10-12 of U.S. Pat. No. 3,009,582. Such a connector is U-shaped in section, having one leg fixed to an end of a horizontal beam and a free leg terminating in attachment means for engagement with a vertical post. The vertical post is of channel construction having a web and a pair of side flanges each of which has a reverse bend portion adapted to be received between the legs of the connector, and a terminal surface spaced from and facing the web of the channel. The attachment means, which are formed as hook-shaped lugs, are insertable through apertures provided in the web of the vertical post by relative horizontal movement between the post and the beam; and, subsequent downward movement of the beam places the hook-shaped lugs in overlapping engagement with the web of the post. Relative upward and horizontal separating movements of the beam relative to the post result in disengagement of the connector and can be accidentally caused, for example, by a careless lift truck operator.

According to the invention, relative horizontal separating movement between the horizontal beam and the vertical post is limited by locking means carried by the free leg of the connector and including a locking portion resiliently biased to a locking position in which the locking portion projects from the free leg toward the fixed leg of the connector and is adapted to overlap the aforementioned terminal surface of the vertical post in response to engagement of the attachment means on the connector with the web of the vertical post. Thus, the terminal surface of the post serves as a locking surface which, when overlapped by the locking portion of the locking means, limits horizontal movement of the connector relative to the post so that the attachment means on the connector cannot be withdrawn from the apertures in the web of the post.

In the presently preferred construction of the invention disclosed herein, the locking means comprises a strip of resilient material having the locking portion formed on one end thereof and projecting substantially perpendicular to the strip through a first aperture in the free leg of the connector; and the other end of the strip is secured to the free leg of the connector, preferably by the engagement of a U-shaped portion formed on the other end of the strip in a second aperture in the free leg of the connector, the projection of the locking end portion of the strip through the first aperture serving to maintain the U-shaped end portion of the strip in relatively fixed relation to the free leg of the connector. The first and second apertures in the free leg of the connector are preferably vertically spaced but are not vertically aligned so that the U-shaped end portion of the strip does not overlap the locking surface of the post when such surface is overlapped by the locking end portion of the strip.

Other features and advantages of the invention will appear from the description to follow of the embodiment shown in the accompanying drawings.

DESCRIPTION OF THE DRAWINGS

FIG. 1 is a fragmentary perspective view showing portions of a vertical post and horizontal beams of a storage rack structure incorporating the connector of the invention;

FIG. 2 is an exploded perspective view similar to FIG. 1 showing one of the horizontal beams disconnected from the vertical post;

FIG. 3 is a sectional elevation, taken as indicated by the line 3—3 of FIG. 4, showing the connection between one hoirzontal beam and a vertical post;

FIG. 4 is a side elevation of a vertical post, a horizontal beam and the connection between them;

FIG. 5 is a sectional plan view taken as indicated by the line 5—5 of FIG. 4; and, FIG. 6 is a sectional plan view taken as indicated by the line 6—6 of FIG. 4.

DESCRIPTION OF THE PREFERRED EMBODIMENT

The storage rack structure 10 fragmentarily shown in FIGS. 1 and 2 includes horizontal beams 12 and 14 attached to a vertical post 16 which is ordinarily connected by suitable stringers 18 and braces 20 to an oppositely facing post (not shown). Each of the beams 12 and 14 is of a desired length; the post 16 is of a desired height; and a complete storage rack would be formed of additional beams and posts attached to each other in the manner illustrated and described below.

A connector 22 is provided at each end of each beam and is U-shaped in horizontal section, having one leg 23 fixed to the end of the beam, a reverse bend portion 24, and a free leg 25 terminating in attachment means in the form of a pair of lugs 26.

Each vertical post 16 is of channel construction having a web portion 28 provided with apertures 29 engageable by the lugs 26, and a pair of side flanges 30. Each of the side flanges 30 has a reverse bend portion 32 which is adapted to be received between the legs 23 and 25 of a connector 22 and which ends at a vertically extending terminal surface 34 facing the web portion 28.

Attachment of one of the beams 12 or 14 to the post 16 is carried out by first moving the beam horizontally relative to the post so as to place the reverse bend portion 32 between the legs 23 and 25 of the connector 22 and to insert the lugs 26 of the connector 22 in a pair of apertures 29 of the post. Subsequent downward movement of the beam relative to the post places hook-shaped portions 36 on the lugs 26 in overlapping engagement with the web 28 of the post, as best shown in FIG. 3.

The foregoing storage rack construction, which is disclosed in U.S. Pat. No. 3,009,582 and has been in commercial use for many years, offers a convenient form of self-engaging connection requiring no fastening elements. However, the construction has always been subject to accidental or unwanted disengagement which is prevented by the self-locking connector of the present invention, best shown ing FIGS. 3-6.

Essentially, this self-locking connector comprises locking means 38 carried bby the free leg 25 of the connector 22 and having a locking portion 40 resiliently biased to a locking position (see FIG. 5) in which the locking portion 40 projects from the free leg 25 toward the fixed leg 23 of the connector 22 and is adapted to overlap the terminal surface 34 of the post 16. This terminal surface 34 thus forms a locking surface engageable by the locking portion 40 for limiting relative horizontal separating movement between the horizontal beam 14 and the vertical post 16.

In the construction shown, the locking means 38 consists of a strip 42 of resilient material, such as spring steel. The locking portion 40 is formed on one end of the strip 42 and projects substantially perpendicular to the length of the strip through a first aperture 44 provided in the free leg 25 of the connector 22. Means comprising a U-shaped portion 46 formed on the other end of the strip 42 engages a second aperture 48 formed in the free leg 25 of the connector and secures the other end of the strip in relatively fixed relation to the free leg 25. This relation is maintained by the projection of the locking portion 40 of the strip 42 through the first aperture 44.

As shown in FIG. 3 and by a comparison of FIGS. 5 and 6, the first and second apertures 44 and 48 in the free leg 25 of the connector are vertically spaced and are offset so that when the connector 22 is attached to the post 16 and the locking portion 40 of the strip 42 overlaps the locking surface 34, the second aperture 48 is overlapped by the flange portion 30 of the post. This offset relation of the apertures 44 and 48 prevents any overlapping engagement between the U-shaped end 46 of the strip 42 and the locking surface 34 of the post, which engagement would interfere with the operation of detaching the connector 22 from the post. The detaching operation is further facilitated by forming the strip 42 with a bowed intermediate portion 50 which is spaced from the free leg 25 of the connector 22 when the locking portion 40 is in locking position as shown in FIG. 4. A prying tool or wedge can be inserted beneath the portion 50 to retract the locking portion 40 from locking position.

Assembly of the strip 42 to the connector 22 is carried out by placing the strip in a position other than one of end-to-end alignment with the apertures 44 and 48, by hooking the U-shaped end 46 of the strip in the aperture 48, and by then rotating the strip about the aperture 48 until the locking portion 40 of the strip snaps into the aperture 44. A self-retaining connection of the strip 42 to the connector 22 is thereby established.

The operation of attaching to a post 16 a horizontal beam 14 equipped with the connector 22 and strip 42 is carried out in the manner previously described. During relative horizontal movement between the connector and the post, a cam surface 52 (FIG. 5) on the locking portion 40 of the strip 42 engages the reverse bend 32 of a post flange 30 causing the resiliently biased portion 40 to retract. When the portion 40 passes inwardly of the locking surface 34, it returns with a self-locking action to the postion shown in FIG. 5 wherein the locking portion 40 overlaps the locking surface 34 and limits relative horizontal separating movement between the connector-equipped beam 14 and the post 16.

The detaching operation requires a positive retraction of the locking portion 40 from its locking position (e.g. with the aid of a prying tool or wedge, as mentioned above), and an oppositely facing cam surface 54 (FIG. 5) on the locking portion 40 may assist in this retraction during relative horizontal separating movement between the connector-equipped beam 14 and the post 16.

The simplicity and low cost of the improved connector 22 are manifest.

What is claimed is:

1. A connector for attaching a horizontal beam to a vertical post of a storage rack, said connector being of U-shaped section having one leg fixed to an end of the horizontal beam and a free leg terminating in attachment means for engagement with the vertical post, and said vertical post including a portion adapted to be received between said connector legs; wherein the improvement comprises:

locking means carried by said free leg of said connector for limiting relative horizontal separating movement between the horizontal beam and the vertical post;

said locking means including a locking portion resiliently biased to a locking position in which said locking portion projects from said free leg toward said fixed leg of the connector and is adapted to overlap a locking surface on said vertical post portion in response to engagement of said attachment means with the vertical post.

2. A connector according to claim 1, wherein said free leg of said connector is provided with a first aperture through which said locking portion projects.

3. A connector according to claim 2, wherein said locking means comprises a stip of resilient material having said locking portion formed on one end thereof and projecting substantially perpendicularly to said strip through said first aperture, and means for securing the other end of said strip in relatively fixed relation to said free leg of said connector.

4. A connector according to claim 3, wherein said means for securing said strip comprises a U-shaped portion formed on the other end of said strip, a second aperture formed in said free leg of said connector for engagement by said U-shaped end portion of said strip, the projection of said locking portion through said first aperture maintaining said U-shaped end portion of said strip in relatively fixed relation to said free leg.

5. A connector according to claim 4, wherein said first and second apertures are vertically spaced and said second aperture is overlapped at least in part by said vertical post portion when said locking portion overlaps said locking surface of such post.

6. A connector according to claims 3, 4 or 5, wherein said strip has an intermediate portion which is spaced from said free leg of said connector when said locking portion is in locking position.

7. A connector according to claim 6, wherein said locking portion is provided with a cam surface engageable by said vertical post portion for displacing said locking portion from locking position during relative engaging movement between said connector and said vertical post.

8. A connector according to claims 1 or 2, wherein said locking portion is provided with a cam surface engageable by said vertical post portion for displacing said locking portion from locking position during relative engaging movement between said connector and said vertical post.

* * * * *